United States Patent [19]
von Holdt

[11] Patent Number: 6,106,261
[45] Date of Patent: Aug. 22, 2000

[54] APPARATUS FOR MOLDING A ONE-PIECE ARTICLE IN A SINGLE MOLDING OPERATION USING TWO DIFFERENT PLASTIC MATERIALS

[75] Inventor: John W. von Holdt, deceased, late of Niles, Ill., by John W. von Holdt, Jr., executor

[73] Assignee: John W. von Holdt, Niles, Ill.

[21] Appl. No.: 09/144,015

[22] Filed: Aug. 31, 1998

[51] Int. Cl.[7] .................................................. B29C 45/16
[52] U.S. Cl. ................ 425/130; 264/328.8; 264/328.12; 425/572; 425/573
[58] Field of Search .................................. 425/130, 572, 425/573; 264/328.8, 328.12

[56] References Cited

U.S. PATENT DOCUMENTS

| | | |
|---|---|---|
| 3,366,019 | 1/1968 | McGee . |
| 3,397,814 | 8/1968 | Zackheim . |
| 3,493,645 | 2/1970 | Sanderson et al. . |
| 3,613,966 | 10/1971 | Summers . |
| 3,956,550 | 5/1976 | Sutch . |
| 4,236,629 | 12/1980 | Dwinell . |
| 4,320,861 | 3/1982 | Rieke et al. . |
| 4,342,799 | 8/1982 | Schwochert . |
| 4,422,563 | 12/1983 | Babiol . |
| 4,555,048 | 11/1985 | Hamman et al. . |
| 4,568,006 | 2/1986 | Mueller et al. . |
| 4,618,078 | 10/1986 | Hamman et al. . |
| 4,625,889 | 12/1986 | Baughman . |
| 4,632,282 | 12/1986 | Nagashima . |
| 5,004,126 | 4/1991 | Klesius . |
| 5,147,591 | 9/1992 | Yoshida . |
| 5,221,028 | 6/1993 | Dwinell . |
| 5,288,448 | 2/1994 | Andersson . |
| 5,529,743 | 6/1996 | Powell . |
| 5,543,104 | 8/1996 | Stratford et al. ..................... 264/328.8 |
| 5,601,215 | 2/1997 | Stolz . |
| 5,788,100 | 8/1998 | Sturk . |
| 5,897,823 | 4/1999 | Davis et al. . |

FOREIGN PATENT DOCUMENTS

| | | |
|---|---|---|
| 0226783 | 11/1986 | European Pat. Off. . |
| 2578819 | 3/1985 | France . |
| 2415419 | 10/1974 | Germany . |

*Primary Examiner*—Tim Heitbrink
*Attorney, Agent, or Firm*—Banner & Witcoff, Ltd.

[57] ABSTRACT

A method and apparatus for molding a one-piece article in a single molding operation using two different plastic materials so a first portion of the article is made of one plastic material and a second portion of the article is made of a different plastic material, and the two portions are fused together while hot to create a one-piece article.

12 Claims, 5 Drawing Sheets

APPARATUS FOR MOLDING A ONE-PIECE ARTICLE IN A SINGLE MOLDING OPERATION USING TWO DIFFERENT PLASTIC MATERIALS

BACKGROUND OF THE INVENTION

The present invention relates to a one-piece combination of a plastic lid and a pour spout which are molded in a single molding operation from two different plastic materials. While the invention may have broader application, it will be described here in conjunction with a plastic lid and a flexible plastic pour spout which is integral with the lid and can be collapsed to a relatively flat position and can be pulled out to an extended position when it is desired to pour liquid from a bucket which is closed on the top by the lid.

Such a pour spout must have a relatively thin spout section to permit it to be pressed into a generally flat or collapsed position when not in use, and to be pulled out to an extended position when the spout is to be used for pouring from a bucket on which the lid is attached. In contrast, the plastic lid must be more rigid than the pour spout.

It has been known heretofore to mold a pour spout and attach it to a lid. Thus, the lid and pour spout are molded separately, and then an operation is carried out to attach the pour spout to the lid. Where a pour spout is to be used, the lid must be molded with a fitting to which the pour spout can be attached. Such a fitting will normally include a solid portion which can be punched out to create a hole where the pour spout attaches. The pour spouts have their own screw cap or the like for closure. If no pour spout is utilized, the lid can function as a normal closure for an open top bucket.

Known pour spouts comprise relatively soft, thin plastic in the spout area, combined with a relatively rigid base portion which attaches to the lid fitting. Such a base portion may be made of metal, or relatively rigid plastic. Known pour spouts also have a screw-on cap so the spout can be opened and closed. In some cases, the spout will snap onto a fitting portion on the lid, while in other cases the spout may screw on to the lid fitting. In all such cases, the pour spout is attached to the lid after the lid has been molded, and such pour spouts are relatively expensive.

The known pour spouts have significant disadvantages. As noted above, they are relatively expensive, and of course an attachment operation is required after the lid is molded. Beyond that, plastic bucket and lid combinations are often required to be subjected to drop tests to assure that filled buckets can withstand a given drop without the lid disengaging or any of the contents being lost. The various known spouts as described above which snap or screw on to a lid fitting have not performed well when subjected to required drop tests. In addition, there is a theft problem because the relatively expensive pour spouts can easily be removed from the lid fitting.

It is also known to mold a plastic lid, and to connect a molded pour spout to such a lid by fusing or welding the pour spout to a fitting formed on the lid. Such a method also involves attaching the pour spout to a lid after the lid is molded.

Another known technique involves connecting a previously molded pour spout to a lid during the molding of the lid. The foregoing known technique utilizes a pair of mold inserts which position a previously molded pour spout in a lid mold during molding of a lid, and the pour spout is positioned so that the lid plastic will surround an annular projecting rim or flange at the base of the pour spout to fuse the lid to the pour spout.

An improvement over the foregoing known technique is disclosed in the inventor's co-pending U.S. patent application, Ser. No. 09/106,231, filed Jun. 29, 1998. In the co-pending application, there is disclosed an improvement for mechanically interconnecting a pour spout to a lid during the molding of the lid. Such a technique offers the advantage that the connection between the pour spout and the lid is not created solely by fusion, but rather involves a mechanical interconnection.

The known techniques for providing a plastic lid with a plastic pour spout fall basically into two categories. In one case, a pour spout and a lid are molded in separate operations and the two molded articles are subsequently attached. In the second case, a pour spout is molded first, and then the previously molded pour spout is fused or interconnected to a lid during the molding of the lid.

None of the foregoing known techniques involves the basic concept of the present invention which is to mold a pour spout and a lid from two different plastic materials in a single molding operation which produces a one-piece lid with an integral pour spout.

In accordance with the present invention, a dual extruder plastic injection molding machine is used which can independently control the timing and shot size of the first and second plastic materials in a manner as to fuse or blend the two plastic injected materials at a predetermined location of the combined one-piece, molded article.

While a two-shot molding machine which will inject two different plastic materials is known, the usual technique involves injecting the first plastic material, and then after the first shot, core pulls are mechanically moved in preparation for the second shot. However, in accordance with the present invention, the two shots of two different plastic materials may be performed substantially simultaneously without the use of any mechanical moving core pulls in either one of the two mold valve gates.

In accordance with the present invention, a one-piece plastic lid and spout is produced having a spout portion of a flexible material and the lid made of a more rigid plastic. Such a product will pass the test requirements of the packaging industry.

It is preferred that injection of each plastic be independently programmed. For optimum results, an operator practicing the present invention can consider the speed, injection pressure and timing of each of the two injection systems and thereby evaluate the flow characteristics, the flow distance, and the location and conditions of the melt where the two plastic materials meet to insure a good mixed blend and optimum fusion of the two plastic materials.

The present invention involves providing one spout injection system which injects plastic directly into the center of the spout cavity while at the approximate same time a second independent lid injection system is operated to inject a different plastic material at the center of the lid cavity.

An important advantage of the present invention is that it produces a one-piece lid and integral pour spout made of two different plastic materials where the spout and lid are fused in an improved manner to eliminate leakage between them.

Another advantage is that the fusion between the lid and pour spout is improved over previously known techniques so that improved drop test results are achieved where the pour spout will not pop off the lid even under severe testing conditions.

One reason for the foregoing advantages is because the present invention involves the fusing of two hot plastic materials which can readily fuse with one another. The previously known fusion techniques involved fusing of a previously molded pour spout, so that even when such fusion is accomplished during molding of the lid, the fusion still must occur using a relatively cold pour spout which was molded in a prior molding operation.

Still another advantage of the present invention is reduction of molding cost due to the avoidance of requiring two separate molding operations to produce the pour spout and the lid. The present invention requires only a single molding operation.

The foregoing and other objects and advantages of the invention will be apparent from the following description of certain preferred embodiments thereof, taken in conjunction with the accompanying drawings.

Now, in order to acquaint those skilled in the art with the manner of making and using the invention, there are described, in conjunction with the accompanying drawings, certain preferred embodiments of the invention.

DETAILED DESCRIPTION OF THE INVENTION

Figure 1:
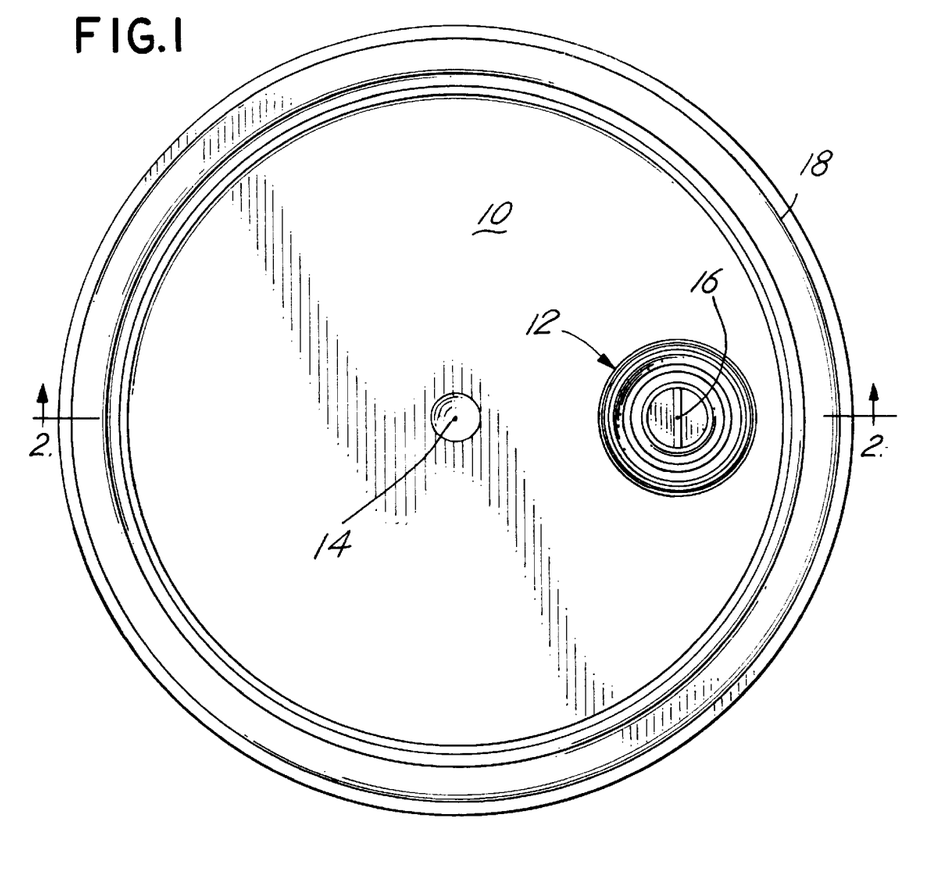
FIG. 1 is a top plan view of a plastic lid and pour spout showing the location of the pour spout relative to the center of the lid.
Figure 2:
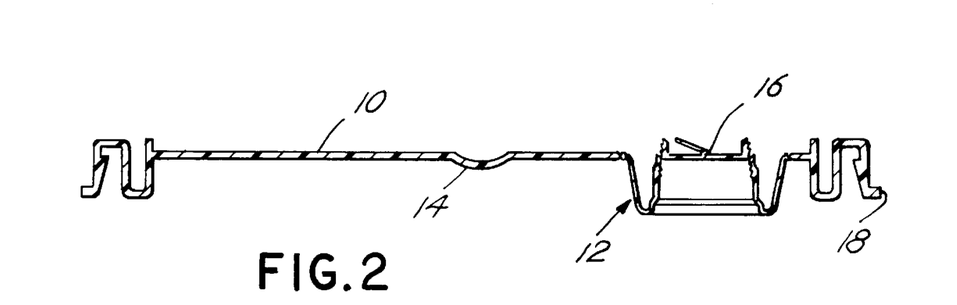
FIG. 2 is a vertical section taken along the line 2—2 of FIG. 1.

Referring to FIGS. 1 and 2, there is shown a lid 10 and a pour spout 12. The center of the lid 10 is shown at 14, and the center of the pour spout 12 is shown at 16. The spout 12 is offset from the center 14 of the lid, but is located radially inwardly of an outer annular edge 18 of the lid. A more complete description of the pour spout and the manner in which it moves between collapsed and extended positions is provided in the co-pending U.S. patent application, Ser. No. 09/106,231. The pour spout 12 is shown in FIG. 2 in its collapsed position as when not in use.

Figure 3:
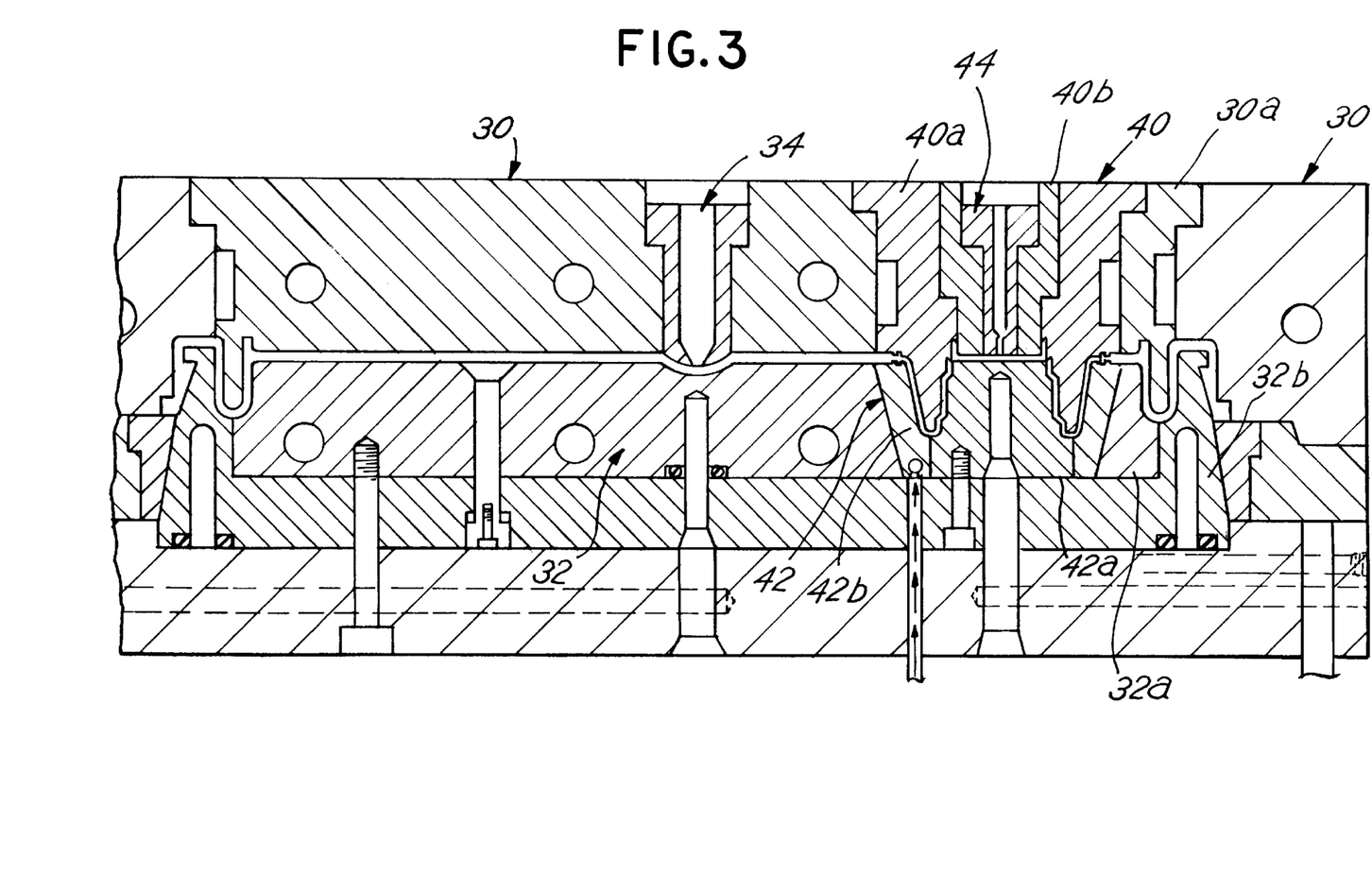
FIG. 3 is an enlarged, fragmentary, vertical sectional view showing a portion of a lid mold with two mold gates for practicing the present invention, the mold cavity being defined between upper and lower mold halves.

Reference is now made to FIG. 3 which shows a mold for molding a one-piece lid and pour spout in accordance with the present invention. FIG. 3 shows a mold cavity having the configuration of the combination lid and pour spout of FIG. 2 and thus illustrates the type of mold to be used in accordance with the present invention to mold the combination lid and pour spout of FIG. 2 in a single molding operation using two different plastic materials.

When using the known technique of positioning a previously molded pour spout in a lid mold so it can be fused to the lid during molding of the lid, the pour spout is positioned in a lid mold using a pair of mold inserts. In accordance with the present invention, a pair of mold inserts are positioned in a lid mold for the purpose of defining a spout cavity, whereby the spout and lid can be molded in the same molding operation.

FIG. 3 shows an upper lid mold half 30 and a lower lid mold half 32. The two lid mold halves are shown in the closed position where they define a cavity having the configuration of the lid shown at 10 in FIGS. 1 and 2. A gate is shown at 34 where molten plastic is injected to mold the lid, the gate 34 being positioned at the center 14 of the lid cavity so that the molten plastic will flow radially outwardly from the gate to fill the lid cavity and form the outermost rim of the lid as shown at 18 in FIGS. 1 and 2.

A pair of mold inserts are positioned in the lid mold to define a cavity for the pour spout 12. FIG. 3 shows an upper mold insert 40 and a lower mold insert 42, the inserts being shown in closed positions to define a cavity having the configuration of the pour spout as shown at 12 in FIG. 2. The upper mold insert 40 comprises multiple components indicated at 40a and 40b, and a pour spout gate 44 is shown at the center of mold insert component 40b which gate is located at the center of the pour spout cavity.

The lower mold insert 42 comprises multiple components indicated at 42a and 42b. An upper mold insert is also shown at 30a and lower mold inserts at 32a and 32b to form a cavity portion which defines the radially outer portion of the lid 10.

As shown in FIG. 3, there is one mold gate 34 for the lid and a separate mold gate 44 for the pour spout. Two such gates are required to practice the present invention which involves molding a one-piece lid and pour spout from two different plastic materials in a single molding operation.

Figure 4A:
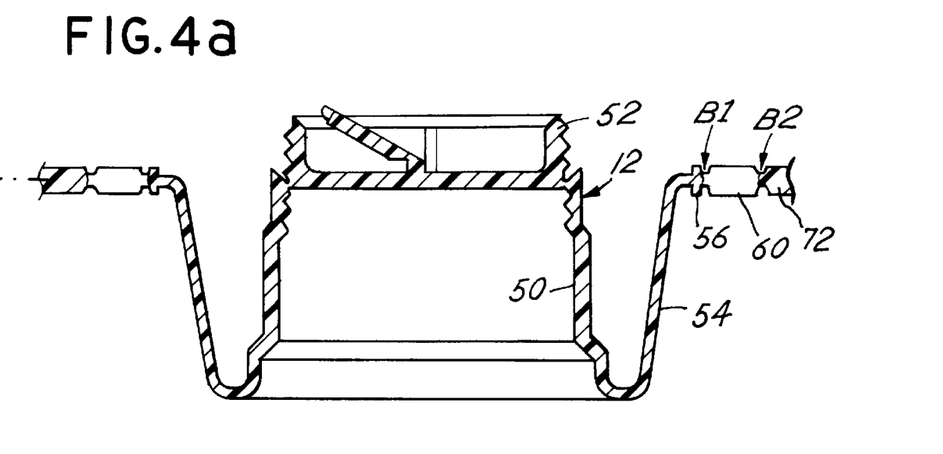
FIG. 4a is a schematic view showing a pour spout mold cavity and a fragmentary portion of a surrounding lid cavity, the view showing molten spout plastic injected to fill the spout cavity except for a desired flange portion yet to be formed, and showing the lid plastic filling the lid cavity except for a portion immediately surrounding the spout cavity.
Figure 4B:
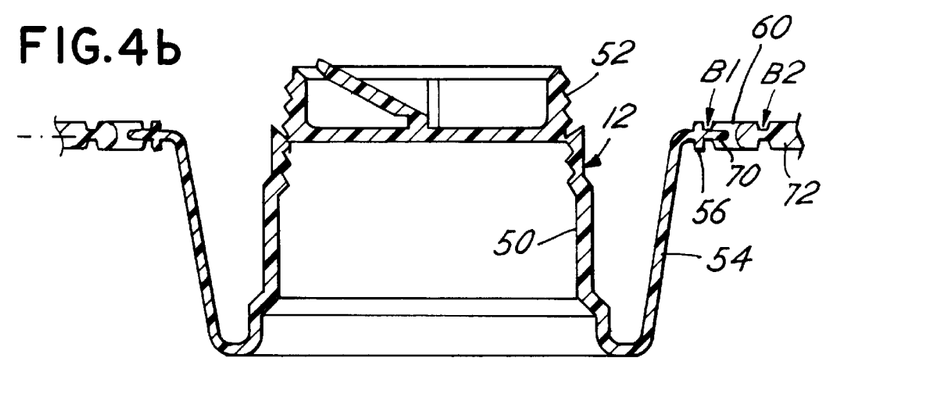
FIG. 4b is a view similar to FIG. 4a showing the spout plastic passed radially outwardly through a barrier to form an annular flange portion, and showing the lid plastic having passed radially inwardly through a second barrier to a cavity area proximate and surrounding the spout flange portion.
Figure 4C:
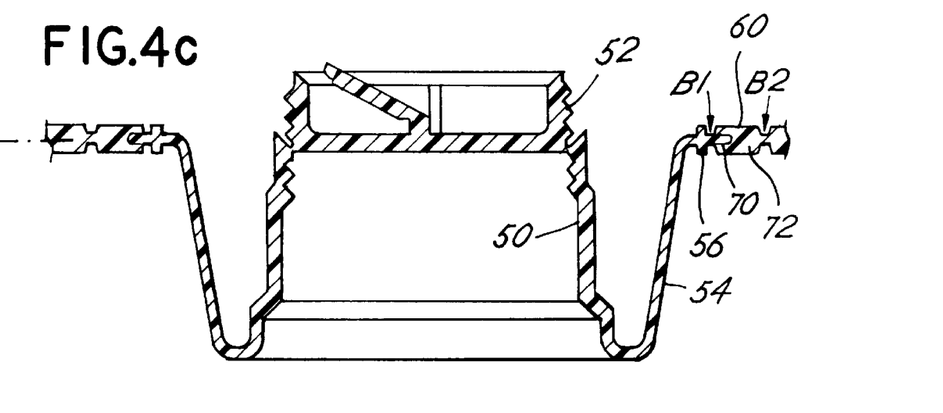
FIG. 4c is a view similar to FIG. 4b but showing the lid plastic having filled the lid cavity to encapsulate the flange portion of the spout to create a one-piece lid and spout combination made in a single molding operation from two different plastic materials.

FIGS. 4a, 4b and 4c are provided to illustrate the flow of molten plastic into the respective cavities from the two mold gates shown in FIG. 3. The foregoing figures represent one embodiment of the invention where barriers are provided to control the flow of molten plastic in the mold cavity area where the outer annular rim of the pour spout fuses with the surrounding lid material. In the particular embodiment shown, there are two such barriers provided at B-1 and B-2.

While FIGS. 4a, 4b and 4c are described as showing cavities in a mold and are provided to illustrate the flow of molten plastic in such a mold, terms such as "pour spout cavity" and "pour spout" will be used interchangeably, since the drawings show not only a cavity, but also a pour spout being formed.

FIG. 4a shows the pour spout 12 which is described in detail in the co-pending application, Ser. No. 09/106,231. For present purposes, the spout 12 includes a spout portion 50, an integral cap 52 which can be separated from the spout and threaded into the spout portion 50, a thin flexible section 54, and a surrounding annular rim 56. The pour spout is shown in its as molded, collapsed position, but when in use it may be extended to pour liquid from a container which is closed at its upper end by the lid 10.

In the condition shown in FIG. 4a, the molten plastic injected into the spout gate (see 44 in FIG. 3) has flowed radially outwardly and filled the spout cavity out to and including the annular rim 56 where it has reached the first annular barrier identified as B-1. Also, the molten plastic injected into the lid gate (see 34 in FIG. 1) has filled the lid cavity except for an area shown at 60 which surrounds the spout rim 56. Thus, the lid plastic as shown in FIG. 4a has filled the lid cavity and has filled an area surrounding the spout cavity up to a barrier shown at B-2 in FIG. 4a. The only portion of the mold cavity not filled with plastic molten plastic as shown by FIG. 4a is the annular area 60 which is disposed between the two barriers B-1 and B-2.

FIG. 4b shows that the molten spout plastic has flowed radially outwardly to pass through barrier B-1 and form a relatively thin annular flange in annular cavity 60. As will be discussed more fully in connection with FIG. 5, the radius leading from barrier B-1 to the annular cavity 60 is rather sharp, which tends to cause the spout plastic to form a relatively thin flange as shown at 70, as opposed to filling the entire cavity 60.

As also shown in FIG. 4b, the lid plastic 72 has flowed radially inwardly to pass through barrier B-2 and enter the annular cavity 60. As will be more fully described in conjunction with FIG. 5, the radius leading from barrier B-2 into the annular cavity 60 is relatively large, so as to induce the lid plastic to fill the annular cavity 60. The desired final condition is shown in FIG. 4c where the lid plastic 72 has totally filled annular cavity 60 and completely encapsulated the annular spout flange 70.

The resulting product comprises a one-piece lid with an integral spout as shown in FIG. 4c and in FIGS. 1 and 2. The lid is made of a different plastic from the pour spout, and usually it is preferred to use a more flexible plastic for the pour spout and a more rigid plastic for the lid. The fusion created between the flange 70 of the pour spout and the surrounding lid plastic shown at 72 in FIGS. 4b and 4c is more effective than is achieved by any of the techniques heretofore known. Such improved fusion is accomplished because the two plastics being fused in annular chamber 60 are both in a hot condition. As previously explained, prior techniques involving fusion were conducted using a previously molded pour spout which is cold at the time fusion is effected.

As explained earlier, the present invention is practiced by using two mold valve gates for injecting different plastic materials for molding the pour spout and the lid. It is contemplated that the injection of the two plastic materials will be carried out approximately simultaneously. Having in mind FIGS. 4a and 4b, assuming the optional barriers B-1 and B-2 are used, it is desirable that the spout plastic reach the barrier B-1 at about the same time the lid plastic reaches the barrier B-2. As shown in FIG. 4b, it is also desirable that the spout plastic begin to pass through barrier B-1 at the same time the lid plastic begins to flow through barrier B-2.

However, as also shown in FIG. 4b, the objective of the invention is to cause the spout plastic to form a flange portion 70 or like structure which is less thick than the thickness of the cavity 60, and to have that flange portion formed shortly before the lid plastic arrives to encapsulate the flange portion and completely fill the cavity 60 in which the two plastics fuse and harden.

As noted earlier, where a dual extruder plastic injection molding machine is used, an operator can independently control the timing and shot size of the plastic being injected into the two plastic gates shown at 34 and 44 in FIG. 3. Depending on the pressures, the shot size, and the two types of plastic used, it may be found desirable to inject the spout plastic into gate 34 very shortly prior to injecting the lid plastic into gate 44. Apart from the above-mentioned parameters, the barriers B-1 and B-2, if used, will also control the plastic flow into the annular fusion chamber or cavity 60.

All of the above mentioned molding parameters can be controlled by an operator to achieve the desired final result, which is to form a soft structure in the general nature of an annular flange as shown at 70 in FIG. 4b prior to the time that the lid plastic fully fills the fusion chamber 60 and encapsulates that flange. In certain applications, satisfactory fusion may occur if nothing more is accomplished than to have the respective plastic materials meet in a fusion chamber such as the annular chamber 60 which surrounds the rim area of the spout cavity. However, optimum results will normally be achieved if a soft structure in the nature of annular flange 70 is formed first and then immediately thereafter is encapsulated by lid plastic in the manner illustrated by FIGS. 4a, 4b and 4c.

It is believed that for most applications, optimum results can be achieved by using the two barriers shown at B-1 and B-2, or using at least one of the two barriers. Such barriers aid in controlling the flow of the plastic materials into the annular fusion chamber 60. Also, as noted earlier, by controlling the radii of the entrances from the barriers to the fusion chamber 60, it is possible to cause the spout plastic to form an annular flange, or a structure of that general nature, while at the same time causing the lid palstic to fill the chamber 60 and thereby encapsulate the flange while the latter is still hot and soft. Nevertheless, for some applications, the barriers may be eliminated.

Figure 5:
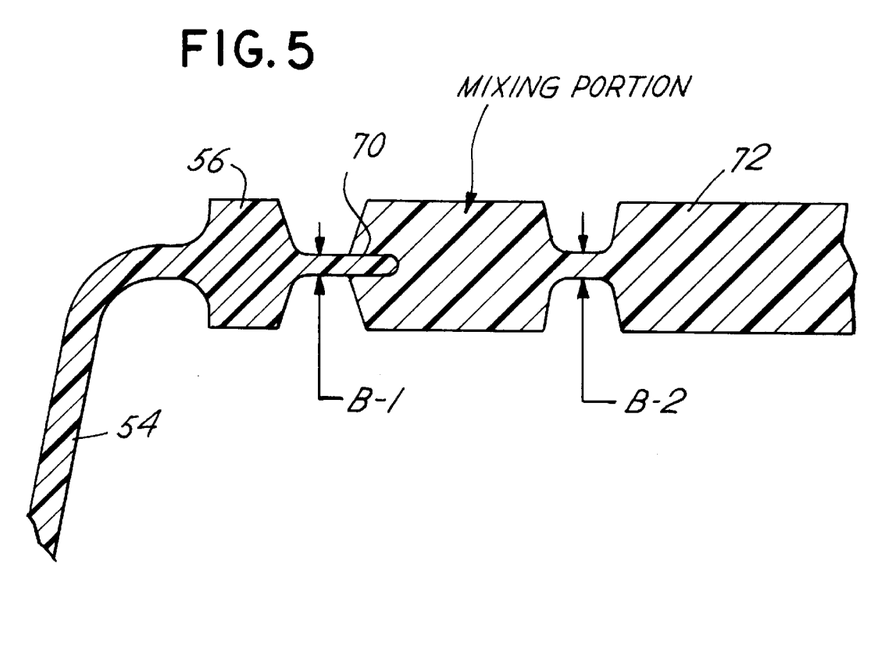
FIG. 5 is an enlarged, fragmentary vertical section showing the rim area of a pour spout and a portion of a surrounding lid, and showing two annular areas of reduced thickness at B-1 and B-2 caused by the flow barriers in the mold cavities of FIGS. 4a, 4b and 4c.

FIG. 5 is an enlarged fragmentary sectional view showing a molded one-piece lid and pour spout and illustrating in particular the radially outer portion of the spout including the thin annular portion 54, the thickened annular rim 56 and the annular flange 70. FIG. 5 further illustrates a portion of the surrounding lid 72. The designation B-1 is used to illustrate the thickness of the thin flange 70 which is controlled by the mold cavity flow barrier designated B-1 in FIGS. 4a, 4b and 4c. Similarly, the designation B-2 is used to illustrate the thin annular trough or channel formed in the lid portion 72 which surrounds the rim of the pour spout and is controlled by the cavity flow barrier designated B-2 in FIGS. 4a, 4b and 4c. The cavity barriers B-1 and B-2 are desirable to obtain optimum results. However, in some applications, one or both of the barriers may be eliminated.

Figures 6A, 6B, 6C:
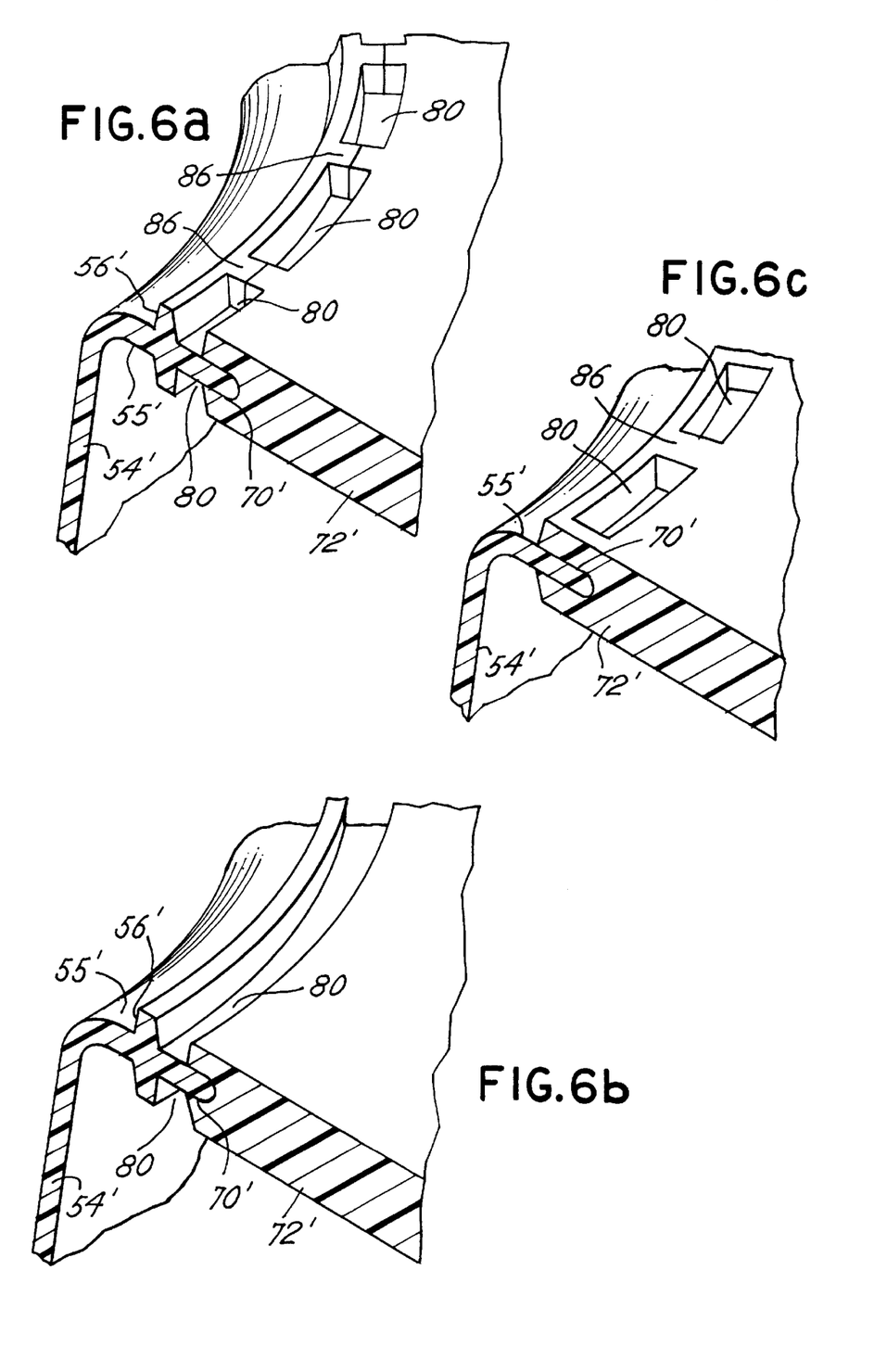
FIG. 6a is a fragmentary, isometric view of an alternative embodiment illustrating how spaced ribs may be added to reinforce an annular area of reduced thickness.
FIG. 6b is a view similar to FIG. 6a showing an alternative embodiment where an area of reduced thickness is not reinforced by spaced ribs.
FIG. 6c is a view similar to FIGS. 6a and 6b showing another embodiment where the rim area of the spout is of constant thickness without a thickened rim portion.

Reference is now made to FIGS. 6a, 6b and 6c. FIG. 6a is a fragmentary, isometric view of an annular, flexible pour spout portion 54' comparable to that shown at 54 in FIG. 5.

The pour spout portion 54' extends upwardly and then radially outwardly to create an annular rim area 55'. A thickened annular rim is shown at 56', similar to the rim shown at 56 in FIG. 5. An annular flange is shown at 70', which is similar to the flange 70 of FIG. 5, and is shown embedded and encapsulated by surrounding lid plastic 72'.

FIG. 6a is thus similar to FIG. 5 except it shows a structure which was molded using only the cavity flow barrier shown at B-1 in FIG. 5, without using the B-2 barrier. As a result, there is an annular trough or channel 80 radially outwardly of the thickened annular rim 56' (to the right as viewed in FIG. 6a). As also shown in FIG. 4c and in FIG. 5, the barrier B-1 in the mold cavity creates the thin flange portion 70' in FIG. 6a, and where that thin section fuses and is encapsulated by the thicker surrounding lid plastic 72', an annular trough 80 is formed both above and below the flange 70'.

FIG. 6a further shows a plurality of spaced ribs 86. Such ribs 86 are optional but for certain applications they may be desirable to reinforce the junction between the outermost pour spout rim area and the surrounding lid plastic. It is a simple matter to modify the mold to inserts of FIG. 3 to produce the spaced ribs 86.

Still referring to FIG. 6a, the annular trough or channel 80 created by barrier B-1 is formed both above and below the annular flange 70' (as best shown in FIG. 5). Thus, where reinforcing ribs 86 are provided, it is preferred that they be formed above and below flange 70' and bring the thickness of the plastic up to that of the surrounding lid plastic 72' thereby eliminating any depression or trough in the area of the reinforcing ribs 86.

FIG. 6b is a view identical to FIG. 6a but without the spaced ribs 86. Thus, while use of the barrier B-1 in the mold cavity will create the annular trough 80, the resulting weakness in that area will not be a problem in many applications, in which case the reinforcing ribs 86 are not required. Neither FIGS. 6a, 6b or 6c shows an annular trough in the lid plastic surrounding the pour spout flange 70, as at B-2 in FIG. 5, because FIG. 6 represents a lid and spout combination molded with use of the barrier B-1 but without barrier B-2.

FIG. 6c is a further isometric view similar to FIG. 6a and including the spaced ribs 86, the only difference being there is no thickened rim 56' formed around the outer annular area of the pour spout. Instead, the thin section 55' terminates in the previously described outermost annular flange 70' of the pour spout, and that flange is encapsulated by the surrounding lid plastic 72' with which it is fused during the molding operation when both plastics are hot. The thickened rim, shown at 56 in FIGS. 4 and 5 and at 56' in FIGS. 6a and 6b, is desirable to add strength to the outer annular area of the pour spout, but in some applications, especially in smaller sizes, it may be eliminated, as represented by FIG. 6c.

Figure 7:
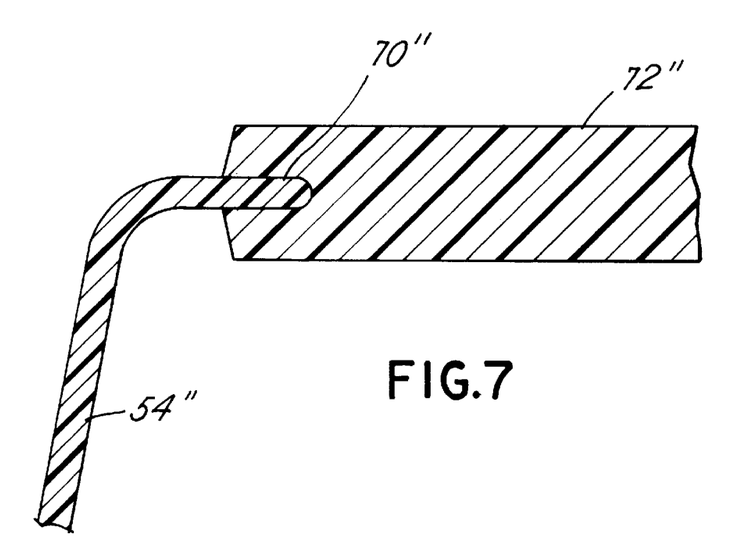
FIG. 7 is a fragmentary, vertical section showing another embodiment where a spout rim of constant thickness is encapsulated by a surrounding lid, the structure being representative of a lid and spout combination molded without the use of mold cavity barriers.

FIG. 7 is an enlarged vertical section similar to FIG. 5 and shows a flexible pour spout section 54" and a surrounding portion of a lid 72". An annular flange 70" is shown at the radially outermost rim area of the pour spout as in the prior embodiments. However, in this embodiment, the thickened rim shown at 56 in FIG. 5 is eliminated, and the outermost spout flange 70" is similar in thickness to the annular flexible spout portion 54".

Also, the product shown in FIG. 7 was molded without use of either of the two barriers B-1 and B-2, so there are no annular troughs or channels formed. As noted earlier, such barriers are desirable to achieve optimum results, but may not be essential for all applications, particularly where smaller sizes are involved. FIG. 7 is similar to the structure shown in FIG. 6c except in the latter case a barrier B-1 was used resulting in the annular trough 80.

In summary, the present invention relates to a method and apparatus for molding a one-piece lid and pour spout in a single molding operation using two different plastic materials. The pour spout is molded from one plastic material, and the lid is molded from a different plastic material. In many cases, a more rigid type of plastic material will be used for the lid.

While a double-shot injection molding machine is known, such machines normally involve use of movable core pulls where a first shot of plastic is injected, and then the core pulls are moved prior to the injection of a second plastic. In accordance with the present invention, no core pulls or other mold parts in either one of the mold halves are moved between the two shots of plastic. Instead, such injection of two different plastic materials is accomplished practically simultaneously.

It is intended that the injection of the two plastic materials into their respective gates be independently programmed. The speed, injection pressure and timing of each independent injection system can be controlled, taking into account the flow characteristics, the flow distance, and the location of the fusion chamber such as shown at 60 in FIG. 4. It is a matter of controlling the shot size of the two injected materials so they can mix or fuse at a desired location which is the area where the lid plastic surrounds the periphery or outermost rim of the pour spout.

The mold cavity flow barriers shown at B-1 and B-2 in FIGS. 4 and 5 are an important feature of the invention even though they will not be required in all applications. One basic purpose of the barriers as shown in FIG. 4a is to insure that the mold cavity for the spout 12 and the mold cavity for the lid 72 are totally filled before the respective plastic materials flow into the fusion chamber 60. An operator can control the amount of plastic injected into the respective gates (see 34 and 44 in FIG. 3) to assure that the pour spout and lid cavities are properly filled and that the plastics then flow into the fusion chamber such as shown at 60 in FIG. 4.

When one or both barriers B-1 and B-2 are used, an operator can determine the optimum degree of opening to afford the desired plastic flow. Referring to FIG. 4b, it is desired to cause the pour spout plastic to flow into the fusion chamber 60 to create a flange-like structure, but not to fill the chamber. The barrier B-1 may be sized to achieve the desired result, depending on the flow characteristics of the particular plastic material being used for molding the pour spout. The movement of the bar or rod (not shown) which forces plastic into a given spout or lid cavity will normally be slowed toward the end of the stroke as the plastic material is being forced into the fusion chamber 60 shown in FIG. 4b.

Despite the advantages of using one or both of the barriers B-1 and B-2, when molding smaller size pieces, or when optimum fusion or bonding of the two plastic materials is not required, one or both of the barriers may be eliminated. As noted hereinabove, FIG. 7 represents a structure which is molded without use of either of the two cavity flow barriers. However, the structure shown in FIG. 7 does not include the thickened pour spout rim shown at 56 in FIG. 5. Where such a thickened rim is desired, the barrier B-1 is required to provide a relatively thin annular flange such as shown at 70 in FIG. 5. The rim 56 is highly desirable to provide rigidity in many cases, but in some instances, particularly with smaller sizes, it may not be required.

The term "annular" as used herein and in the appended claims is used in the broad sense and is not intended to require that the pour spout have a circular rim area or that the annular fusion chamber which surrounds the pour spout rim area be circular. Most known plastic pour spouts are circular, but the present invention is not limited to pour spouts having a circular rim.

What is claimed is:

1. For use with a dual extruder plastic injection molding machine having first and second independent injection systems, a mold for molding a onepiece article in a single molding operation using two different plastic materials so a first portion of said article is made of a first plastic material and a second portion of said article is made of a second plastic material, said mold when in its closed position comprising, in combination:

a first mold cavity for molding said first portion;

a second mold cavity for molding said second portion;

each of said first and second mold cavities having its own separate gate into which plastic is injected;

said first and second mold cavities communicating with one another through a common fusion chamber;

said fusion chamber having a first entrance from said first cavity which entrance is located so said first plastic material will enter said fusion chamber after said first cavity has been substantially filled;

said fusion chamber having a second entrance from said second cavity which entrance is located so said second plastic material will enter said fusion chamber after said second cavity has been substantially filled;

a barrier at least at said first or second entrance to said common fusion chamber to control the flow of plastic from the associated first or second cavity to said fusion chamber after the associated first or second cavity has been filled;

whereby said first and second plastic materials will enter said common fusion chamber after said first and second cavities have been substantially filled and will fuse said first and second portions together while still hot to create said one-piece article.

2. A mold as defined in claim 1 where a barrier is provided at said first entrance to said common fusion chamber to control the flow of said first plastic material into said common fusion chamber after said first cavity has been filled.

3. A mold as defined in claim 1 where a flow barrier is provided at said second entrance to said common fusion chamber to control the flow of said second plastic material into said common fusion chamber after said second cavity has been filled.

4. A mold as defined in claim 1 where a first flow barrier is provided at said first entrance to said common fusion chamber to control the flow of said first plastic material into said chamber after said first cavity has been filled, and a second flow barrier is provided at said second entrance to said common fusion chamber to control the flow of said second plastic material into said chamber after said second cavity has been filled.

5. A mold as defined in claim 1 where said second mold cavity is relatively small compared to said first cavity and said common fusion chamber surrounds a rim area of said second cavity.

6. A mold as defined in claim 3 where said flow barrier is dimensioned so that said second plastic material flowing into said common fusion chamber is formed as a layer of material which is relatively thin compared to the thickness of said common fusion chamber and said first entrance is designed to permit said first plastic material to substantially fill said chamber whereby said first plastic material will encapsulate said layer of said second plastic material and fuse therewith.

7. A mold as defined in any of claims 1–6 where said one-piece article is a lid with an integral pour spout, said first cavity is a lid cavity designed to mold a lid for closing the top of a container, and said second cavity is a pour spout cavity designed to mold a pour spout integral with said lid, said pour spout cavity having a relatively small diameter relative to a said lid and being located within the confines of said lid cavity but off-center relative thereto.

8. For use with a dual extruder plastic injection molding machine having first and second independent injection systems, a mold for molding a onepiece lid and pour spout in a single molding operation using two different plastic materials so said lid is made of a first plastic material and said pour spout is made of a second plastic material, said mold when in its closed position comprising, in combination:

a lid cavity for molding said lid;

a pour spout cavity for molding said pout spout, said pour spout cavity being located within the confines of said lid cavity but off-center relative thereto;

to each of said lid and pour spout cavities having its own separate gate into which plastic is injected;

said lid cavity and said pour spout cavity communicating with one another through a common annular fusion chamber which surrounds a rim area of said pour spout cavity;

said fusion chamber having a first entrance from said lid cavity which entrance is located so said first plastic material will enter said fusion chamber after said lid cavity has been substantially filled;

said fusion chamber having a second entrance from said pour spout cavity which entrance is located so said second plastic material will enter said fusion chamber after said pour spout cavity has been substantially filled;

whereby said first and second plastic materials will enter said fusion chamber after said lid and pour spout cavities have been substantially filled and will fuse said lid to said pour spout around a rim area of said pour spout while said lid and pour spout are still hot to create said one-piece lid and pour spout.

9. A mold as defined in claim 8 where a barrier is placed at said first entrance to said fusion chamber to control the flow of said first plastic material into said fusion chamber after said lid cavity has been filled.

10. A mold as defined in claim 8 where a flow barrier is provided at said second entrance to said fusion chamber to control the flow of said second plastic material into said fusion chamber after said pour spout cavity has been filled.

11. A mold as defined in claim 8 where a first flow barrier is provided at said first entrance to said fusion chamber to control the flow of said first plastic material into said fusion chamber after said lid cavity has been filled, and a second flow barrier is provided at said second entrance to said fusion chamber to control the flow of said second plastic material into said fusion chamber after said pour spout cavity has been filled.

12. A mold as defined in claim 10 where said flow barrier is dimensioned so that said second plastic material flowing from said pour spout cavity into said fusion chamber is formed as an annular flange which is relatively thin compared to the thickness of said fusion chamber and said first entrance is designed to permit said first plastic material flowing from said lid cavity to substantially fill said fusion chamber whereby said lid plastic will encapsulate said annular flange of said pour spout and fuse therewith.

* * * * *